INVENTOR.
JAMES M. DONNELLY
BY
Russell N. Muehleman
AGENT

United States Patent Office 3,509,552

Patented Apr. 28, 1970

3,509,552

MAGNETIC MEMORY SYSTEM HAVING COMBINED READING AND HIGH-SPEED WRITING APPARATUS

James M. Donnelly, Carol Stream, Ill., assignor to Automatic Electric Laboratories, Inc., Northlake, Ill., a corporation of Delaware Filed Feb. 21, 1968, Ser. No. 707,126

Int. Cl. G11c *5/02, 11/08, 7/00*

U.S. Cl. 340—174 9 Claims

ABSTRACT OF THE DISCLOSURE

High-speed switching capability for a great number of magnetic storage elements along a drive line is provided by apparatus for controlling the switching of elements in a matrix by voltage-controlled ratchet switching techniques and a matrix bias scale which maintains all unselected matrix isolation diodes nonconductive. Circuit economies are achieved by combining parts of the reading and writing circuits. Ratchet pulse width is chosen to be greater than the switching time in order to obtain the largest possible output signals an element is capable of producing.

BACKGROUND OF THE INVENTION

Field of the invention

This invention relates to magnetic memory systems and is particularly concerned with apparatus for biasing and driving a matrix.

Prior art

Some known memory systems which employ storage elements of the type having nonintersecting holes and a common volume therebetween use separate reading and writing circuits. These known memory systems further use a method of biasing the matrix so that the word isolation diodes are not reverse-biased during writing which causes the bus capacitances of the matrices to be charged by the ratchet writing current sources. Such a drain of current is deducted from the current available to switch the storage elements causing an increase in the writing time.

Attempts have been made to overcome the above problem by isolating the word current supply from the system ground. For information on this technique one may refer to the paper entitled "An NDRO Airborne Memory System Utilizing the Micro-BIAX Element," by M. G. Peterson, Paper 2.5, Wescon Convention Record, 1965. Such high-frequency isolation is, however, difficult to accomplish and has proven successful for short word lengths only.

SUMMARY OF THE INVENTION

The present invention solves the above capacitance charging problem by providing unique biasing to the matrix so that all unselected isolation diodes are reverse-biased and remain nonconductive. Further, voltage-controlled, rather than current-controlled switching as in prior systems, is employed to decrease the high element back voltage which results from current-controlled switching and permit the use of lower bias potentials. For a given switching time, the voltage across the storage elements will be much lower than with current-controlled switching, and conversely, for a given supply voltage, faster switching times may be obtained by employing voltage-controlled switching. Advantageously then, lower supply voltages and less expensive electronic components may be employed. A current generator combined with a voltage clamp provide a current-limited voltage source which has been found to be a most advantageous switching voltage supply.

Although high-speed operation is a desirable feature of a memory system, a fast operating speed does not always provide optimum operation. It has also been discovered that greater output signals may be obtained from a given storage element with a minimum sacrifice in operating speed by selecting the duration of the ratchet pulse to be slightly longer than the switching time of the element to allow for a stabilization of flux changes in the element.

BRIEF DESCRIPTION OF THE DRAWINGS

The invention, its features, organization and construction will be best understood by reference to the description below in conjunction with the following drawings, in which.

DESCRIPTION OF THE PREFERRED EMBODIMENT

General information

Figure 1:
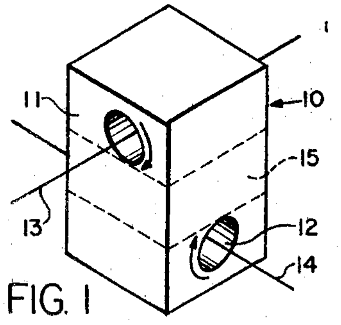
FIG. 1 is an enlarged pictorial view of a bistable magnetic switching element employed in the present invention.
Figure 1A:
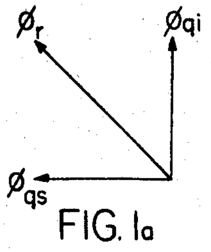
FIGS. 1*a* and 1*b* are vector diagrams relating to the operation of such an element.
Figure 1B:
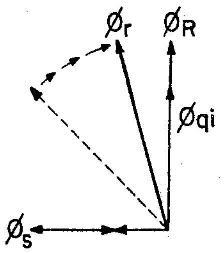

Referring now to FIGS. 1, 1*a* and 1*b*, the operation of the storage element 10 will be briefly explained. The remanent flux around the interrogate hole 11 is always in the same direction, clockwise in the example shown; however, the direction of remanent flux around the storage hole 12 depends on the stored data.

In reading data from the element attention is focused on what is occurring in the common volume 15 (set off by the broken lines) between the interrogate and storage holes. FIG. 1*a* illustrates the quiescent state of the element of FIG. 1 wherein the quiescent flux around the interrogate hole $\phi_{qi}$ and the quiescent flux around the storage hole $\phi_{qs}$ provide the saturation resultant flux $\phi_r$. FIG. 1*b* shows that the application of a reading flux $\phi_R$ in the same direction as the quiescent flux $\phi_{qi}$ causes the saturation resultant $\phi_r$ to be rotated toward the interrogation co-ordinate. This causes a decrease of the storage flux by an amount $\phi_s$ which is sensed as an induced voltage by the conductor 14 which threads the storage hole. The same action occurs for a quiescent storage flux of the opposite direction to provide a $d\phi/dt$ of opposite sense; thus, bipolar output signals are available.

To write into the storage element, a polarized data bit current, which is less than the switching threshold of the storage hole, is applied to conductor 14 and a sequence of positive and negative current pulses, called ratchet pairs, is applied to conductor 13. These pulses are large enough to reverse the flux around the interrogate hole and have the effect of lowering the switching threshold of the material around the storage hole so that the bit current is capable of reversing the direction of the storage flux. The ratchet writing process is cumulative with the number of ratchet pairs: four to five pairs have been found to be about the minimum number required in one particular system to provide sufficient storage switching which would, upon interrogation, provide approximately 100% of the maximum possible signal output.

An adequate model of the ratchet writing process is not yet available although several attempts have been made to provide such a model; however, greater insight with respect to ratchet switching may be had by reference to the J. A. Baldwin Jr., paper entitled "Theory of Ratchet Writing in Thin-Wall Multipath Memory Cores," and the Nistler et al. paper entitled "Phenomenological Model for the BIAX," papers 6.4 and 6.5, respectively, Proceedings of the Intermag Conference, 1965, and the paper "Interleaved Word and Bit Disturbs in Ratchet Writing," also by J. A. Baldwin Jr., IEEE Transactions on Magnetics, June 1966.

Notwithstanding the lack of an accurate switching model, it has been found that there are precautions which must be observed in using ratchet switching. First, in order to prevent destruction of the storage flux, the bit current must overlap the ratchet current. Also, the last ratchet pulse must be in the same direction as the interrogate current so that the interrogate flux is in the proper direction for shuttling by an interrogate current.

The matrix

Figure 2:
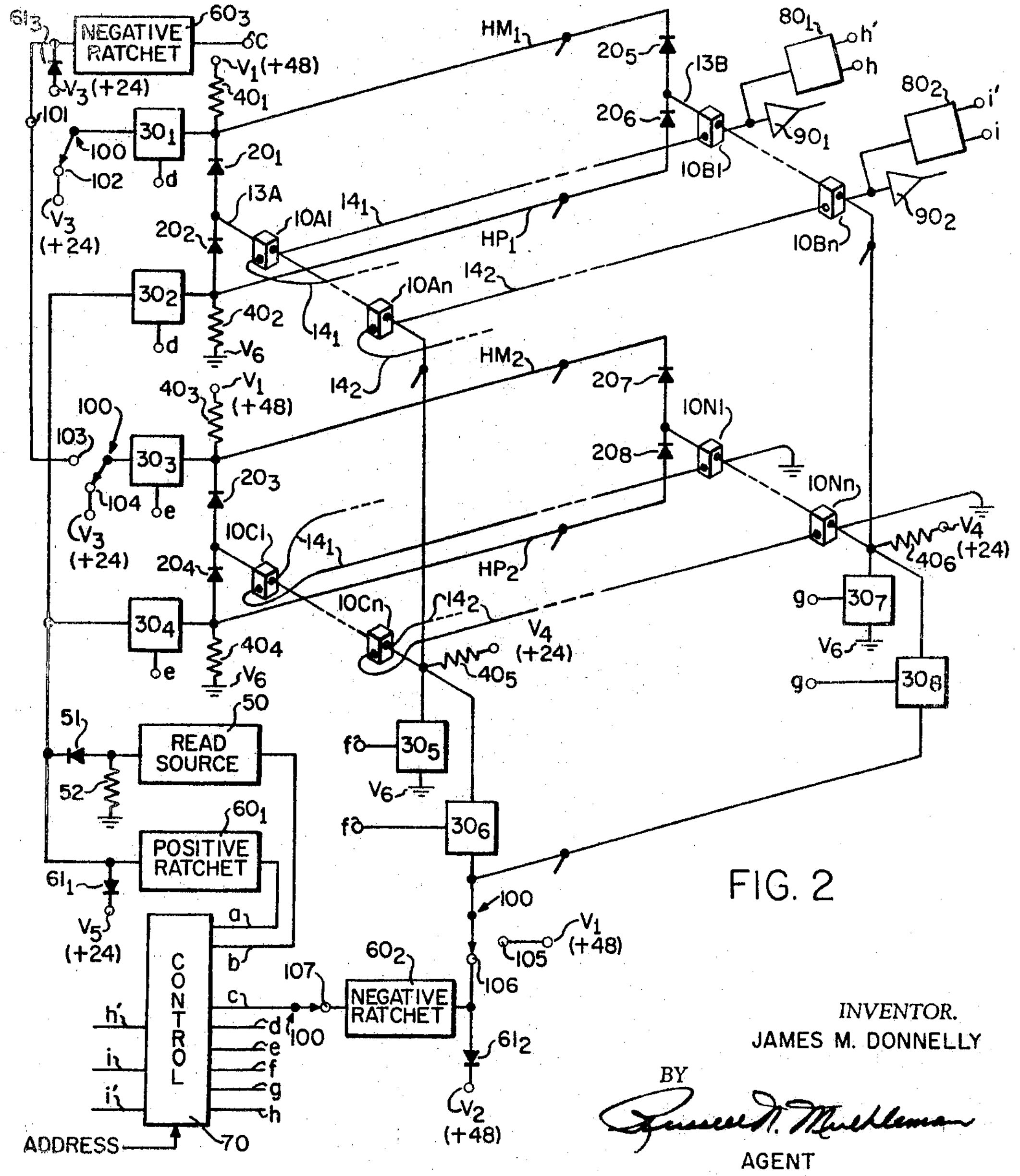
FIG. 2 is a partial schematic, partial block diagram of a memory system constructed in accordance with the teachings of a first embodiment of the invention and, through changes of connections symbolized by a switch, of a second embodiment of the invention.

FIG. 2 illustrates the matrix configuration which is preferred for high-speed operation. A plurality of groups of magnetic elements **10A1–10A*n*—10N1–10N*n* are strung along respective row conductors (word drive lines) 13A–13N**. Connected to one end of the row conductors via diodes $\mathbf{20}_1$–$\mathbf{20}_8$ are conductors $HM_1$–$HP_2$. Connected to the other end of each row conductor are the bus conductors $VB_1$–$VB_2$.

Column conductors (data bit conductors) $\mathbf{14}_1$–$\mathbf{14}_2$ are shown threading separate groups of elements 10 in a specific manner for purpose of illustration only. Since these conductors function as both data and sense lines, other winding configurations which are most suitable to the specific application will be apparent to those skilled in the art.

For convenience and clarity of illustration, the data bit drivers $\mathbf{80}_1$–$\mathbf{80}_2$ and the sense amplifiers $\mathbf{90}_1$–$\mathbf{90}_2$ are shown connected to the same end of the data conductors. These circuits could be connected elsewhere along the data bit conductors, as is commonly practiced, and the circuits may be of any suitable design as long as the data drivers are capable of supplying polarized data signals; hence, the two control inputs *h, h'–i, i'*.

Reading and writing sources

The buses are connected to the reading and writing sources and to sources of potential via switches $\mathbf{30}_1$–$\mathbf{30}_8$. The switch circuit and its connections to the buses are shown in FIGS. *5, 5a* and *5b* and described below. The read source 50 which was employed in one experimental system provided a 250 ma. pulse with a linear rise, while the sources $\mathbf{60}_1$, $\mathbf{60}_2$ for ratchet writing were supplied by a pair of Computer Control Company current generators, Model 2032, which provided 400 ma. current pulses. Diodes $\mathbf{61}_1$ and $\mathbf{61}_2$ are employed to clamp the outputs to $V_5$ and $V_2$ respectively, as will be explained below.

Alternate driving configuration

Switch 100 symbolizes the connection changes necessary to provide a second form of the driving apparatus. These changes remove the source $\mathbf{60}_2$ and its $V_2$ clamp from the VB bus conductors and places a current source (acting as a sink) $\mathbf{60}_3$ and its $V_3$ clamp on the HM bus conductors via switches $\mathbf{30}_1$ and $\mathbf{30}_3$.

Control circuits 70 provide the enabling control pulses *a–i'* to control reading from and writing into the matrix and will be discussed in more detail in the description of operation.

Steering switches

Figure 5:
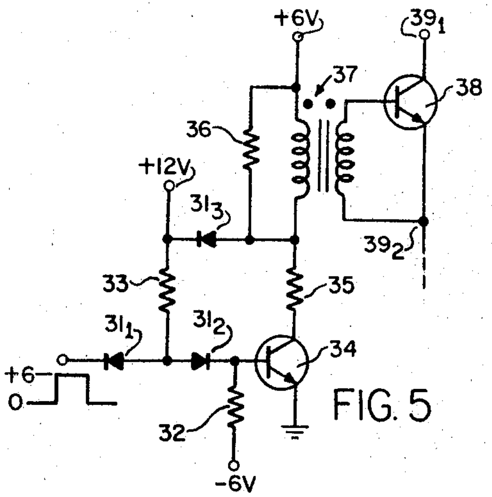
FIG. 5 is a schematic diagram of a steering circuit for use with the matrix of FIG. 2, and FIGS. 5*a* and 5*b* are partial schematic diagrams showing the connection of the steering circuits to the buses of the matrix.
Figure 5A:
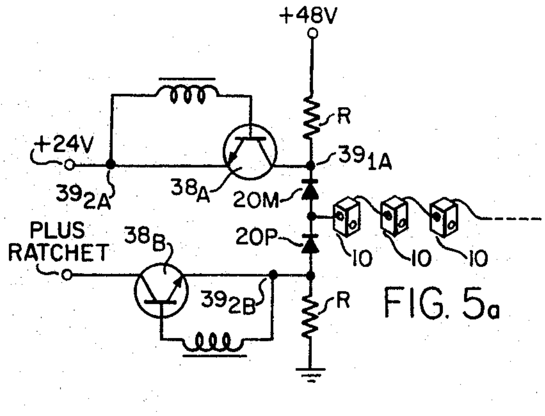
Figure 5B:
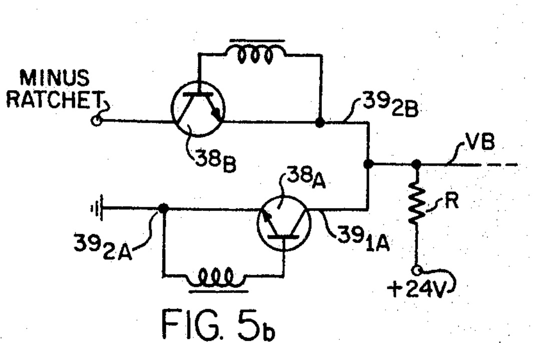

FIG. 5 illustrates a switch circuit which has proven satisfactory in practicing the present invention; however, any suitable switch may be employed. These switches are connected to the buses in pairs, as shown in FIGS. *5a* and *5b*, each pair being primed for conduction by input pulses +6) which cause voltage across the secondary winding of transformer 37 to forward bias the bias-emitter junction of transistor 38. The direction of conduction through the pair, as will be seen below, depends on operation of the ratchet sources.

Biasing the matrix

According to the invention, the matrix of FIG. 2 is biased by employing the above-mentioned bias voltage scale wherein: $V_1=V_2$; $V_3=V_4=V_5$ and $V_6=V_7=$ Ground. The switches which steer the positive ratchet current are also used to steer the read circuit; therefore, $V_6$ was chosen to be at ground potential to minimize noise during reading. The following table illustrates three examples of the relationship between the bias voltages, the number of cores N per drive line and the switching time $t_s$ of the cores.

| | Matrix A | Matrix B | Matrix C |
|---|---|---|---|
| N | 128 | 64 | 128 |
| $t_s$ | 0.5 μs | 0.5 μs | 1.0 μs |
| Voltage scale: | | | |
| $V_1$, $V_2$ | 48 | 24 | 24 |
| V cores | 24 | 12 | 12 |
| $V_3$, $V_4$, $V_5$ | 24 | 12 | 12 |
| V cores | 24 | 12 | 12 |
| $V_6$, $V_7$ | Ground | Ground | Ground |

Generally speaking, Matrix A corresponds to the matrix of FIG. 2.

OPERATION OF THE MATRIX

Control and timing

It is the function of the control circuits to enable the bit drivers, the reading source, the ratchet sources and the steering switches in the proper time relationship upon receipt of input addresses (reading and writing instructions). Switches, such as switches $\mathbf{30}_5$ and $\mathbf{30}_6$, which provide alternate directions of current flow are given the same electrical address and are alternately operated during ratcheting, the operating source and the diodes being the determining factors as to which switch is conducting at a given time. Also, an arbitrary positive direction with respect to a row conductor has been chosen to be into the conductor at the lefthand end thereof in FIG. 2.

Reading

To read from the elements along conductor 13A, an address denoting such action is received by the control circuits 70, and in response thereto the control circuits provide pulses on conductors *b, f* and *d* to operate reading source 50, switch $\mathbf{30}_5$ and switch $\mathbf{30}_2$, respectively. Upon closure of the switches, a 250 ma. —1.2 μsec. pulse with a linear rise for example, is supplied to a path including source 50, diode 51, switch $\mathbf{30}_2$, diode $\mathbf{20}_2$, conductor 13A having elements **10A1–10A*n*** coupled thereto, bus $VB_1$ and switch $\mathbf{30}_5$ to ground.

The read current has the effect illustrated in FIG. 1c of rotating the vector $\phi_r$ toward the interrogation vector to develop $\phi_s$ which is sensed by amplifiers $90_1$–$90_2$ as a voltage induced in conductors $14_1$–$14_2$.

Writing

As an example, to write the binary bit 1 into the element 10B1 which is linked to conductor 13B, control circuits 70 are addressed to provide the electrical addresses of switches $30_1$, $30_2$ $30_7$ and $30_8$, bit driver $80_1$ and ratchet sources $60_1$ and $60_2$.

Terminal *h* is pulsed to provide a bit current from driver $80_1$ through line $14_1$ to ground (activation of *h'* would provide an opposite current). During the application of the bit current, terminals *d* and *g* are activated to line 13B and terminals *a* and *c* are alternately activated to provide current pulses from the sources $60_1$ and $60_2$. The positive current pulses, which are current limited and clamped to +24 volts by diode $61_1$ are applied across line 13B via switch $30_2$, bus $HP_1$, diode $20_6$, bus $VB_2$ and switch $30_7$. The negative ratchet pulses, which are also current limited and clamped to +48 volts by diode $61_2$, are applied across line 13B via switch $30_8$, bus $VB_2$, diode $20_5$, bus $HM_1$, switch $30_1$ and source $V_3$ at +24 volts.

The ratchet process continues for a predetermined number of cycles ending with the ratchet pulse from the source whose pulse corresponds to the direction of the interrogate current. Element 10B1 was used as an example only: any of the elements on line 13B could have also been written into by providing the correct bit currents thereto (applying enabling signals to terminals *h, h'–i, i'*).

In writing into element 10B1 by the alternate driving configuration, switch 100 must be visualized as being connected in positions 101, 103, 105 and 107. The operation is the same as detailed above with the exception that source $60_3$ and clamp $61_3$, $V_3$ is providing a negative potential to potential $V_1$ on contact 105. Accordingly, source $60_3$ acts as a current sink: the effect on element 10B1 is the same as detailed above for switch 100 in the position illustrated.

In the above example of writing only the selected diodes $20_5$, $20_6$ were conductive. Diodes $20_1$, $20_2$, $20_7$ and $20_8$ which are also associated with conductive switches $30_1$, $30_2$, $30_7$, $30_8$ did not at any time have a complete path through a row conductor due to unselected switches $30_3$–$30_6$. In addition, sources $V_1$, $V_4$ and $V_7$ via resistors $40_1$–$40_6$ maintained diodes $20_1$, $20_2$, $20_3$, $20_4$, $20_7$ and $20_8$ nonconductive.

Voltage-controlled switching

Assuming that the interrogate hole of the rectangular element acts like a toroid of the same inner diameter, the switching model can be assumed to be $$\frac{d\phi}{dt}=(nI-F_0)r\sqrt{2\frac{\phi}{\phi_m}-\frac{\phi}{\phi_m}^2}$$

Where:

$F_0$=Switching threshold in ampere-turns
I=Current in amperes
$n$=Turns=1
$r$=Core characteristic in ohms/turn$^2$
$\phi_m$=Remanent flux in webers
N=Number of elements
R=Resistance in series with elements in ohms
$v$=Source voltage in volts and $$v=IR+Nn\frac{d\phi}{dt}$$

letting $$X=\frac{\phi}{\phi_m} \text{ and } \frac{dX}{dt}=\frac{1}{\phi_m}\frac{d\phi}{dt}$$

and assuming that R is negligible, the cores are fully switched at $X=2$. Solving for the switching time $t_s$ (where $t=t_s$) provides $$t_s=\frac{2nM\phi_m}{v}$$

Figures 3, 4:
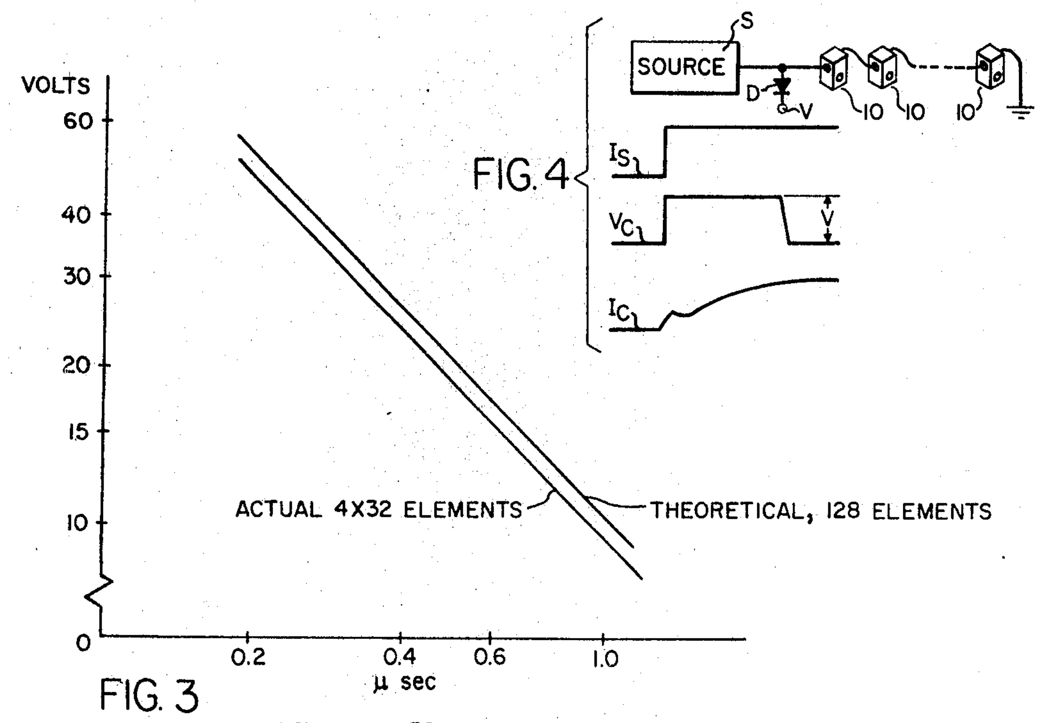
FIG. 3 is a graphical illustration of the agreement between theoretical and measured switching times for a plurality of bistable magnetic elements along a single drive line.
FIG. 4 is a diagram showing the effect of voltage-controlled switching on a plurality of bistable magnetic elements along a single drive line.

FIG. 3 shows the agreement between measured and theoretical values where $\phi_m=0.041\times10^{-6}$ webers and $v=21$ volts. FIG. 4 shows how voltage-controlled switching applies to a number of cores along a drive line. The source S and diode D appear to the cores 10 as a voltage source of V output voltage during switching and as a current source of $I_s$ output current after switching is completed. The switching current should not exceed an optimum value, 400 ma. in this example; therefore, a voltage-clamped current source fulfills such requirements. During the time the cores are switching part of the current $I_s$ is diverted to the clamp diode D. The core voltage $V_c$ is constant at V, then drops to zero and the clamp no longer operates. The core current $I_c$ gradually reaches its prescribed value and all of the source current flows through the element drive line.

Storage hole observations

Figure 6:
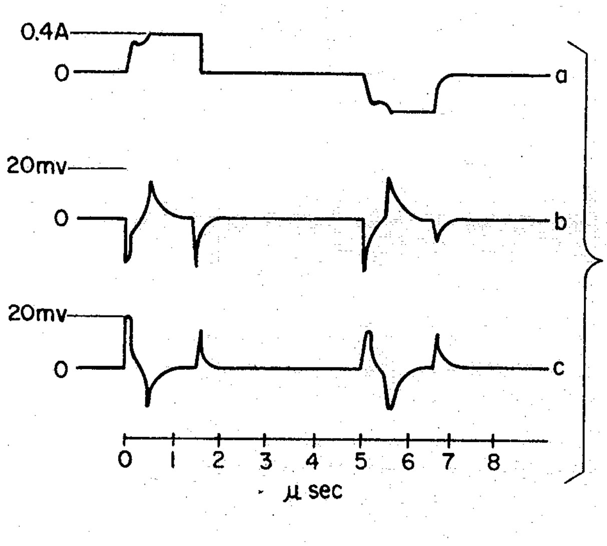
FIG. 6 is a reproduction of oscilloscope traces of storage hole voltage during writing under the influence of oppositely directed data bit currents.
Figure 7:
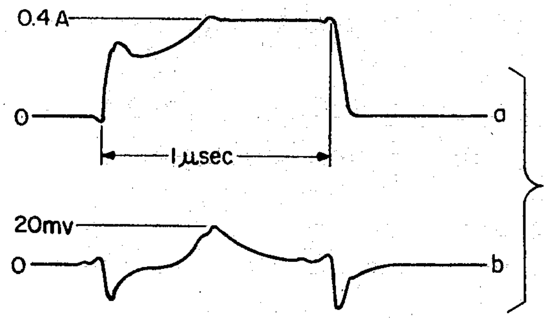
FIG. 7 is a reproduction of oscilloscope traces showing the recovery time for storage hole voltage.
Figure 8:
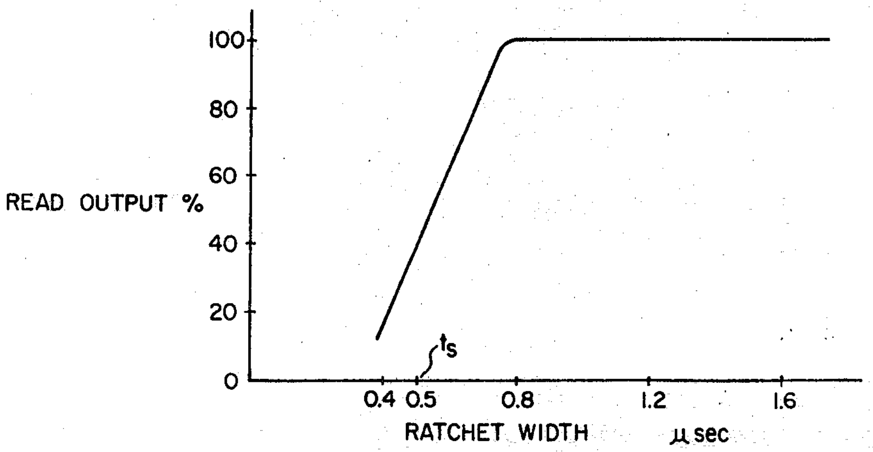
FIG. 8 is a graphical illustration of the relationship between ratchet pulse width and the output signal of a storage element with respect to the switching time of the element.

The switching of the interrogate hole is only a portion of the switching process since the storage hole flux is also affected in several important ways. First, the storage hole voltage during ratcheting depends on the direction of the bit current and not on the direction of the ratchet current. This can be seen in FIG. 6 which shows the ratchet pulses in trace *a* and the storage hole voltages for positive and negative bit currents, traces *b* and *c*, respectively. FIG. 7 shows another important aspect of the storage hole voltage, the timing of the storage hole voltage (trace *b*) with respect to the interrogate hole voltage (ratchet of trace *a*). As can be seen in FIG. 7, the storage hole voltage, which increases rapidly, passes through zero to a peak value and recovers back to zero, reaches its peak when the interrogate hole has nearly completed switching. Therefore, the ratchet pulse must be maintained for a time sufficient to allow the storage hole to recover after switching the interrogate hole. In addition, FIG. 8 shows the effect that decreasing the width of the ratchet pulse has on the output signal. Accordingly, the width of the ratchet pulse must be greater than the switching time to yield maximum output signals.

While the invention has been described by reference to specific illustrative examples, it is to be expected that changes and variations may be made by one skilled in the art without departing from the spirit of the invention and that such modifications will be within the scope of the invention as set forth in the appended claims.

What is claimed is:

1. A magnetic memory system comprising: a plurality of bistable magnetic storage elements arranged in columns and rows, each of said storage elements having first and second openings therethrough; a plurality of column conductors each of which threads the first openings of the storage elements of a separate column; means for energizing selected ones of said column conductors; a plurality of row conductors each of which threads the second openings of the storage elements of a separate row; a plurality of pairs of first bus conductors; a plurality of second bus conductors; a plurality of pairs of diodes, each pair connected in series mutually aiding relation between the bus-conductors of one of said first bus conductor pairs, one end of each row conductor connected to the junction between a corresponding pair of diodes, and each said second bus conductor connected to the other ends of row conductors which are connected via said plurality of diodes to different pairs of bus conductors; biasing means including first, second and third sources of potential which are respectively connected to one and the other conductor of said plurality of first bus conductor pairs and to said second plurality of bus conductors for normally reverse biasing all of said diodes; pulse generating means for producing periodic voltage pulses; switching means connected between said pulse generating means and said bus conductors; control means connected to said switching means for selectively operating said switching means to cause said pulse generating means to apply voltage pulses of alternating direction to said selected row conductor thereby to alternately forward bias the diodes of the pair connected to said conductor and thus reverse the magnetic state of storage elements of said conductor which are threaded by said selected column conductors.

2. The memory system according to claim 1, wherein said biasing means further includes a plurality of resistors separately connected between said pluralities of bus conductors and the respective sources of potential.

3. The memory system according to claim 1 ,wherein each of said storage elements has a predetermined switching time and the application of voltage pulses to a row conductor effects flux excursions about said first openings which correspondingly induce voltage in said plurality of column conductors for a time longer than said predetermined switching time, and wherein said pulse generating means is operable to produce each pulse of a duration greater than said predetermined switching time to allow stabilization of flux about said second openings before another pulse is applied to said row conductor.

4. The magnetic memory system according to claim 1, wherein said pulse generating means comprises first and second voltage pulse sources each including a current source having an output current of a direction opposite to that of the other said first and second voltage pulse sources further including corresponding first and second output terminals connected via said switching means to respective bus conductors of said pairs of first bus conductors, and first and second clamping means connected to said first and second output terminals, respectively.

5. The magnetic memory system according to claim 1, wherein said pulse generating means comprises first and second voltage pulse sources each including a current source having an output current of the same duration as the other, said first and second voltage pulse sources further including corresponding first and second output terminals connected via said switching means to one bus conductor of each said pair of first bus conductors and to said plurality of second bus conductors, respectively, and first and second clamping means connected to said first and second output terminals, respectively.

6. The magnetic memory system according to claim 5, wherein said switching means comprises: a plurality of first switches which are individually connected between said one bus conductor of each said pair of first bus conductors and said first output terminal; a plurality of second switches which are individually connected between the other bus conductor of each said pair of first bus conductors and said third source of potential; a plurality of third switches which are individually connected between said plurality of second bus conductors and said second output terminal; and a plurality of fourth switches which are individually connected between said plurality of second bus conductors and said second source of potential in common with said third switches, said control means being operable to select individual pairs of said first and second switches and individual pairs of said third and fourth switches for operation.

7. The magnetic memory system according to claim 6, wherein individual first and second switches which are connected to the same pair of first bus conductors each have an input terminal connected in common to said control means, individual third and fourth switches which are connected in common to said other end of a second bus conductor each have an input terminal connected in common to said control means, said first and second voltage pulse sources each have an input terminal connected to said control means, said control means having an input for receiving writing and reading instruction signals and operated in response to the receipt of writing instruction signals to apply control signals to selected ones of said commonly connected input terminals of said switches and alternately to the input terminals of said first and second voltage pulse sources, the selected first and fourth switches and said first voltage pulses source operating together and the selected second and third switches and said second voltage pulse source operating together in response to said control signals.

8. The memory system according to claim 7, and further comprising a source of reading current having an input terminal connected to said control means and an output terminal connected in common with said first output terminal to said plurality of first switches, said control means being operable upon receipt of reading instructions to apply control signals to the inputs of a selected one of said plurality of first switches and a selected one of said plurality of fourth switches and a control signal to said source of reading current, the reading current of said source being effective to disturb the magnetic condition of the row of storage elements defined by the selected switches causing voltages indicative of such disturbances to be induced in the plurality of column conductors which thread the first openings of said storage elements, and means connected to said plurality of column conductors for detecting said induced voltages.

9. The memory system according to claim 8, wherein said source of reading current includes a diode connected in series with its output terminal and poled in the direction that is opposite to the polarity of the output of said first voltage pulse source to isolate said source of reading current and said first voltage pulse source.

References Cited

UNITED STATES PATENTS

Re. 26,313 11/1967 Schwenzfeger -------- 307—88

JAMES W. MOFFITT, Primary Examiner

UNITED STATES PATENT OFFICE
CERTIFICATE OF CORRECTION

Patent No. 3,509,552

April 28, 1970

James M. Donnelly

It is certified that error appears in the above identified patent and that said Letters Patent are hereby corrected as shown below:

Column 7, line 40, "duration" should read -- direction --.

Signed and sealed this 29th day of December 1970.

(SEAL)
Attest:

Edward M. Fletcher, Jr.
Attesting Officer

WILLIAM E. SCHUYLER, JR.
Commissioner of Patents